United States Patent
Adema (10) Patent No.: US 12,270,997 B2
(45) Date of Patent: Apr. 8, 2025

(54) SYSTEMS AND METHODS TO MINIMIZE DOUBLE-BOUNCE IN WAVEGUIDES

(71) Applicant: GOOGLE LLC, Mountain View, CA (US)

(72) Inventor: Daniel Adema, Kitchener (CA)

(73) Assignee: GOOGLE LLC, Mountain View, CA (US)

( * ) Notice: Subject to any disclaimer, the term of this patent is extended or adjusted under 35 U.S.C. 154(b) by 800 days.

(21) Appl. No.: 17/464,240

(22) Filed: Sep. 1, 2021

(65) Prior Publication Data

US 2023/0066767 A1 Mar. 2, 2023

(51) Int. Cl.
G02B 27/01 (2006.01)
F21V 8/00 (2006.01)

(52) U.S. Cl.
CPC ....... G02B 27/0172 (2013.01); G02B 6/0023 (2013.01); *G02B 2027/0178* (2013.01)

(58) Field of Classification Search
CPC .............. G02B 27/0172; G02B 6/0023; G02B 2027/0178
USPC ......................................................... 359/630
See application file for complete search history.

(56) References Cited

U.S. PATENT DOCUMENTS

| 6,266,359 | B1 | 7/2001 | Taheri et al. | |
|---|---|---|---|---|
| 6,760,121 | B1 * | 7/2004 | Kimura | B41J 2/473 358/1.7 |
| 2007/0127123 | A1 | 6/2007 | Brown et al. | |
| 2017/0120374 | A1 | 5/2017 | Hendricks et al. | |
| 2017/0365101 | A1 | 12/2017 | Samec et al. | |
| 2018/0198258 | A1 | 7/2018 | Chen et al. | |
| 2019/0179151 | A1 | 6/2019 | Pierer et al. | |
| 2019/0196201 | A1 | 6/2019 | Pierer et al. | |
| 2019/0196207 | A1 | 6/2019 | Pierer et al. | |
| 2019/0351505 | A1 | 11/2019 | O'Neill et al. | |
| 2020/0026080 | A1 | 1/2020 | Pierer et al. | |

(Continued)

FOREIGN PATENT DOCUMENTS

| CN | 216350391 U | 4/2022 |
|---|---|---|
| CN | 216838697 U | 6/2022 |

(Continued)

OTHER PUBLICATIONS

Notice of Allowance mailed Jun. 7, 2023 for U.S. Appl. No. 17/204,451, 24 pages.

(Continued)

*Primary Examiner* — Jerry L Brooks (57) ABSTRACT

Systems and methods to reduce diffraction-angle effects, such as instances of double-bounces and bounce separation spacing effects in a laser projection system including an optical engine with laser diodes configured to emit light beams of different wavelengths and a beam combiner having a reflective surfaces each configured to receive one of the light beams from one of the laser diodes and to reflect the received light beam such that an edge of the reflected light beam lies on a tangent common to the other light beams reflected from the other reflective surfaces. The laser projection system may be implemented in head-mounted display (HMD) including a waveguide having an incoupler to receive the combined light beam, where an edge of the incoupler corresponds to the tangent on which the edges of the plurality of light beams are aligned.

17 Claims, 7 Drawing Sheets

(56) References Cited

U.S. PATENT DOCUMENTS

| | | |
|---|---|---|
| 2020/0033604 A1 | 1/2020 | Schmulen et al. |
| 2020/0225482 A1 | 7/2020 | Bodiya et al. |
| 2021/0109353 A1* | 4/2021 | Nicholson ........... H01S 5/06825 |
| 2021/0149111 A1 | 5/2021 | Katsuyama et al. |
| 2022/0299764 A1 | 9/2022 | Adema et al. |

FOREIGN PATENT DOCUMENTS

| | | |
|---|---|---|
| WO | 2020139754 A1 | 7/2020 |
| WO | 2020257505 A1 | 12/2020 |

OTHER PUBLICATIONS

International Preliminary Report on Patentability mailed Mar. 14, 2024 for PCT/US2022/039407, 9 pages.

Final Office Action mailed Feb. 17, 2023 for U.S. Appl. No. 17/204,451, 11 pages.

Non-Final Office Action mailed Aug. 5, 2022 for U.S. Appl. No. 17/204,451, 11 pages.

International Search Report and Written Opinion mailed Oct. 24, 2022 for PCT/US2022/039407, 12 pages.

* cited by examiner

SYSTEMS AND METHODS TO MINIMIZE DOUBLE-BOUNCE IN WAVEGUIDES

BACKGROUND

In the field of optics, a combiner is an optical apparatus that combines two light sources, for example, environmental light from outside of the combiner and light transmitted from a micro-display that is directed to the combiner via a waveguide. Optical combiners are used in wearable heads up displays (WHUDs), sometimes referred to as head-mounted displays (HMOs) or near-eye displays, which allow a user to view computer-generated content (e.g., text, images, or video content) superimposed over a user's environment viewed through the WHUD, creating what is known as augmented reality (AR) or mixed reality (MR).

Transmitting the light from a micro-display to a user's eye in a WHUD generally involves multiple reflections, refractions, diffractions, and/or changes in polarization that can result in some of the light being prematurely directed out of the waveguide or deviating from the primary path and thus, effectively being "lost" as the light does not reach the intended destination (i.e., a user's eye). This loss of light reduces the efficiency of the WHUD and can cause aberrations in the image(s) viewed by the user, such as, for example, non-uniform brightness and non-uniform color.

BRIEF DESCRIPTION OF THE DRAWINGS

The present disclosure may be better understood, and its numerous features and advantages made apparent to those skilled in the art by referencing the accompanying drawings. The use of the same reference symbols in different drawings indicates similar or identical items.

DETAILED DESCRIPTION

In a conventional WHUD, light, representing visual content, from a micro-display is directed into a waveguide by an incoupler, which transmits or reflects the light at a specific angle such that the light is incident on the boundaries of the waveguide at an angle of incidence greater than the critical angle for total internal reflection (TIR) of the light to occur. The light is then propagated along the inner volume of the waveguide via multiple instances of TIR until the light reaches a structure (i.e., an outcoupler) designed to direct the light out of the waveguide, usually towards a user's eye to be viewed as an image or series of images.

In some cases, the incoupler of a waveguide is implemented as a diffraction grating disposed at a surface of the waveguide, wherein the diffraction grating diffracts different wavelengths of the micro-display light at different angles. Because of these different diffraction angles, the different wavelengths of the micro-display light have different angles of propagation within the waveguide and therefore have different distances between TIR bounces within the waveguide. Further, the different diffraction angles of each wavelength of light can cause some light to be lost from the waveguide through a "double-bounce" effect, wherein light that is transmitted or reflected by the incoupler a first time may be incident on the incoupler a second time as a result of being reflected from a surface of the waveguide back towards the incoupler. When the light is incident on the incoupler for a second time, some of the light is transmitted or reflected out of the waveguide (i.e., "lost") and, consequently, less light than was originally emitted from the micro-display is transmitted through the waveguide to a user's eye resulting in reduced brightness of the image displayed to a user, potentially diminishing the user's experience.

The different diffraction angles of each wavelength of light can also cause different distances between bounces within the waveguide for each wavelength of light. The distance between two adjacent bounces (as measured from the center of the light beam) is known as "bounce separation" and the distance between adjacent bounces of different light beams is referred to as "bounce separation spacing". As bounce separation and bounce separation spacing between the wavelengths of light increases so does the degradation of color uniformity in the image that is displayed to a user. In other words, because light having a relatively short wavelength (e.g., blue light) has a smaller diffraction angle than light of a longer wavelength (e.g., red light) the blue light will have a smaller bounce separation than the red light. That is, the blue light will experience a greater number of TIR bounces within a given area of the waveguide than the red light and, generally, the blue light will have a smaller bounce separation spacing between light beams than the red light. As a result, when the blue and red light encounter an outcoupler of the waveguide, the blue light will experience a greater number of outcoupling bounces than red light, which results in the blue light exiting the waveguide in more locations than red light. Thus, the image displayed to the viewer will have a relatively consistent saturation of blue color across the image while the saturation of red color will vary in certain areas of the image.

FIGS. 1-8 illustrate embodiments of example apparatuses and techniques to reduce diffraction-angle effects, such as instances of double-bounces and bounce separation spacing effects in a display system. However, it will be appreciated that the apparatuses and techniques of the present disclosure are not limited to implementation to the depicted display systems, but instead may be implemented in any of a variety of display systems using the guidelines provided herein. In some embodiments of the example apparatuses, a micro-display associated with a waveguide employs laser diodes configured to produce light beams of different wavelengths, wherein each light beam has a perimeter that is proportional to the expected diffraction angle to be imparted on the particular light beam when incident on an incoupler of the waveguide. For example, in some embodiments, a beam combiner associated with the laser diodes of a micro-display contains reflective surfaces positioned such that an edge of the emitted circular or elliptical light beams are aligned at a tangent so as to be biased at an edge of the incoupler. That is, the light beams are not aligned by the beam combiner based on the centers of the light beams, but, rather, the edges of the light beams are aligned to a common edge of the combined light beam output from the beam combiner. Thus, the example apparatuses and techniques reduce instances of double-bounces and bounce separation spacing of the light beams as they are transmitted within the waveguide.

Figure 1:
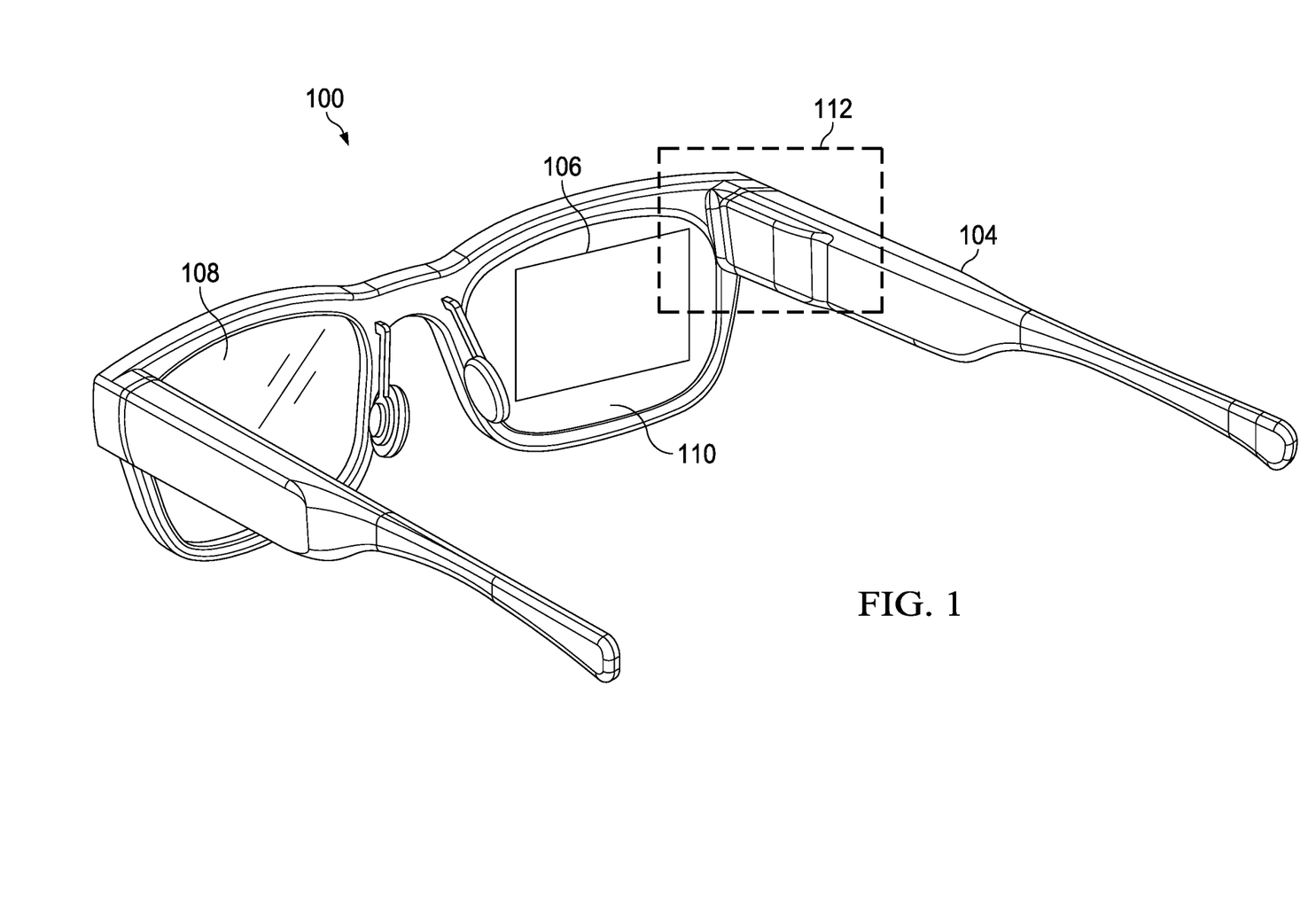
FIG. 1 shows an example display system that includes a laser projection system configured to project images toward the eye of a user in accordance with some embodiments.

FIG. 1 illustrates an example display system 100 having a support structure 102 that includes an arm 104, which houses a laser projection system configured to project images toward the eye of a user, such that the user perceives the projected images as being displayed in a field of view (FOV) area 106 of a display at one or both of lens elements 108, 110. In the depicted embodiment, the display system 100 is a wearable heads-up display (WHUD) that includes a support structure 102 configured to be worn on the head of a user and has a general shape and appearance of an eyeglasses (e.g., sunglasses) frame. The support structure 102 contains or otherwise includes various components to facilitate the projection of such images toward the eye of the user, such as a laser projector, an optical scanner, and a waveguide. In some embodiments, the support structure 102 further includes various sensors, such as one or more front-facing cameras, rear-facing cameras, other light sensors, motion sensors, accelerometers, and the like. The support structure 102 further can include one or more radio frequency (RF) interfaces or other wireless interfaces, such as a Bluetooth™ interface, a WiFi interface, and the like. Further, in some embodiments, the support structure 102 further includes one or more batteries or other portable power sources for supplying power to the electrical components of the display system 100. In some embodiments, some or all of these components of the display system 100 are fully or partially contained within an inner volume of support structure 102, such as within the arm 104 in region 112 of the support structure 102. It should be noted that while an example form factor is depicted, it will be appreciated that the display system 100 may have a different shape and appearance from the eyeglasses frame depicted in FIG. 1.

One or both of the lens elements 108, 110 are used by the display system 100 to provide an augmented reality (AR) display in which rendered graphical content can be superimposed over, or otherwise provided in conjunction with, a real-world view as perceived by the user through the lens elements 108, 110. For example, laser light used to form a perceptible image or series of images may be projected by a laser projector of the display system 100 onto the eye of the user via a series of optical elements, such as a waveguide formed at least partially in the corresponding lens element, one or more scan mirrors, and one or more optical relays. One or both of the lens elements 108, 110 thus include at least a portion of a waveguide that routes display light received by an incoupler of the waveguide to an outcoupler of the waveguide, which outputs the display light toward an eye of a user of the display system 100. The display light is modulated and scanned onto the eye of the user such that the user perceives the display light as an image. In addition, each of the lens elements 108, 110 is sufficiently transparent to allow a user to see through to provide a field of view of the user's real-world environment such that the image appears superimposed over at least a portion of the real-world environment.

In some embodiments, the projector is a digital light processing-based projector, a scanning laser projector, or any combination of a modulative light source such as a laser or one or more LEDs and a dynamic reflector mechanism such as one or more dynamic scanners or digital light processors. In some embodiments, the projector includes multiple laser diodes (e.g., a red laser diode, a green laser diode, and/or a blue laser diode) and at least one scan mirror (e.g., two one-dimensional scan mirrors, which may be micro-electromechanical system (MEMS)-based or piezo-based). The projector is communicatively coupled to the controller and a non-transitory processor-readable storage medium or memory storing processor-executable instructions and other data that, when executed by the controller, cause the controller to control the operation of the projector. In some embodiments, the controller controls a scan area size and scan area location for the projector and is communicatively coupled to a processor (not shown) that generates content to be displayed at the display system 100.

The projector scans light over a variable area, designated the FOV area 106, of the display system 100. The scan area size corresponds to the size of the FOV area 106 and the scan area location corresponds to a region of one of the lens elements 108, 110 at which the FOV area 106 is visible to the user. In some embodiments, the projector routes light via first and second scan mirrors, an optical relay disposed between the first and second scan mirrors, and a waveguide disposed at the output of the second scan mirror. In some embodiments, at least a portion of an outcoupler of the waveguide may overlap the FOV area 106.

In order to reduce instances of double-bounces and bounce separation spacing of the light beams as they are transmitted within the waveguide, in some embodiments, reflective surfaces of a beam combiner associated with the laser diodes are oriented such that the emitted light beams are aligned at a tangent so as to align each of the laser light beams with an edge of the incoupler of the waveguide. Examples of these aspects are described in greater detail below.

Figure 2:
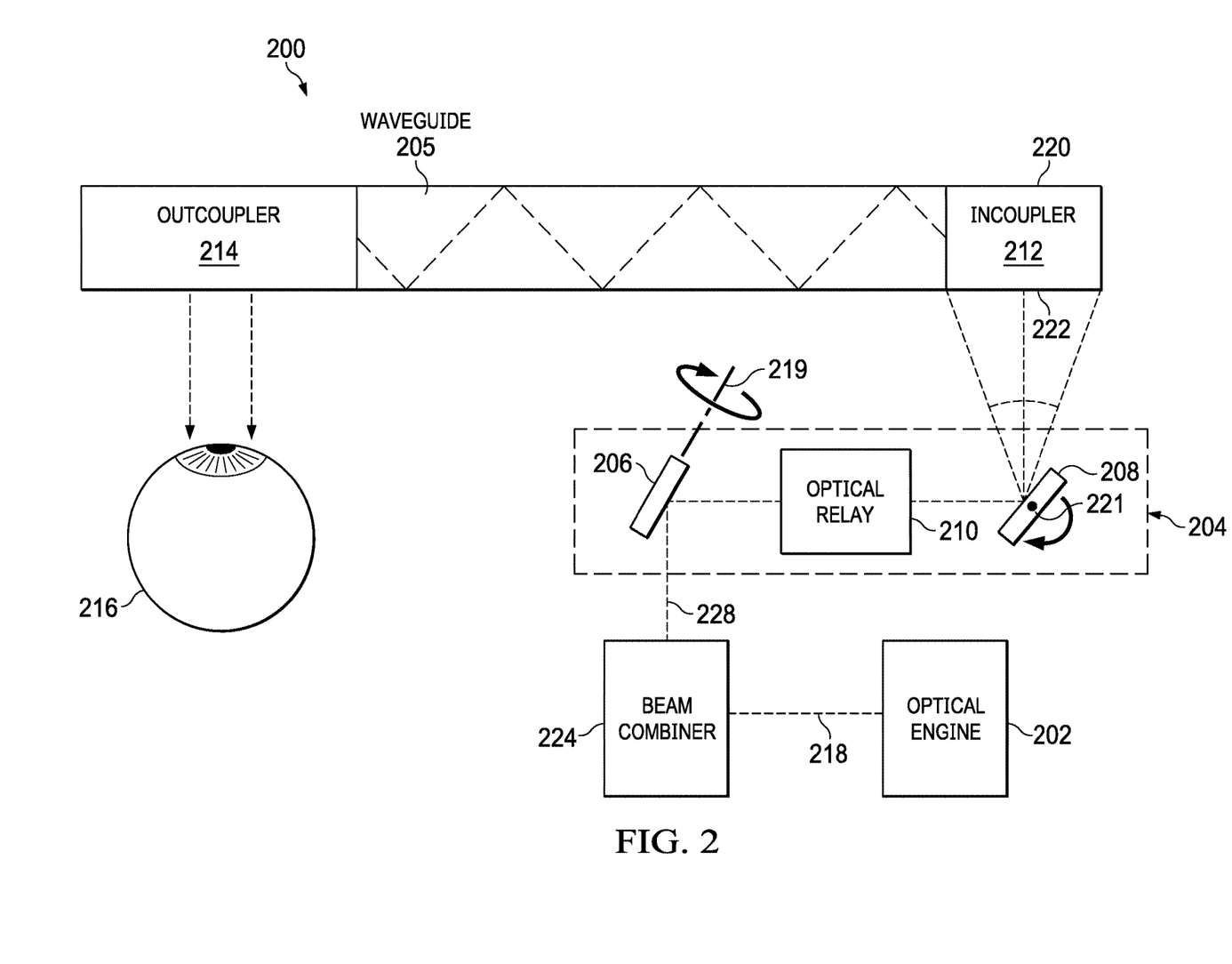
FIG. 2 shows a block diagram of the laser projection system of FIG. 1 in accordance with some embodiments.

FIG. 2 illustrates a simplified block diagram of a laser projection system 200 that projects images directly onto the eye of a user via laser light. The laser projection system 200 includes an optical engine 202, an optical scanner 204, and a waveguide 205. The optical scanner 204 includes a first scan mirror 206, a second scan mirror 208, and an optical relay 210. The waveguide 205 includes an incoupler 212 and an outcoupler 214, with the outcoupler 214 being optically aligned with an eye 216 of a user in the present example. The incoupler 212 of the waveguide 205 includes at least a first edge 220 and a second edge 222. In some embodiments, the laser projection system 200 is implemented in a wearable heads-up display or other display system, such as the display system 100 of FIG. 1.

The optical engine 202 includes one or more laser light sources configured to generate and output light beam 218 (e.g., visible laser light such as red, blue, and green laser light and/or non-visible laser light such as infrared laser light). In some embodiments, the optical engine 202 is coupled to a driver or other controller (not shown), which controls the timing of emission of laser light from the laser light sources of the optical engine 202 in accordance with instructions received by the controller or driver from a computer processor coupled thereto to modulate the light beam 218 to be perceived as images when output to the retina of an eye 216 of a user.

For example, during operation of the laser projection system 200, multiple light beams 218 having respectively different wavelengths are output by the laser light sources of the optical engine 202, then combined via a beam combiner 224 into a combined light beam 228, before being directed to the eye 216 of the user. The optical engine 202 modulates the respective intensities of the laser light beams so that the combined laser light reflects a series of pixels of an image, with the particular intensity of each laser light beam at any given point in time contributing to the amount of corresponding color content and brightness in the pixel being represented by the combined laser light at that time.

One or both of the scan mirrors 206 and 208 of the optical scanner 204 are MEMS mirrors in some embodiments. For example, the scan mirror 206 and the scan mirror 208 are MEMS mirrors that are driven by respective actuation voltages to oscillate during active operation of the laser projection system 200, causing the scan mirrors 206 and 208 to scan the combined light beam 228. Oscillation of the scan mirror 206 causes combined light beam 228 output by the beam combiner 224 to be scanned through the optical relay 210 and across a surface of the second scan mirror 208. The second scan mirror 208 scans the combined light beam 228 received from the scan mirror 206 toward an incoupler 212 of the waveguide 205. In some embodiments, the scan mirror 206 oscillates along a first scanning axis 219, such that the combined light beam 228 is scanned in only one dimension (i.e., in a line) across the surface of the second scan mirror 208. In some embodiments, the scan mirror 208 oscillates or otherwise rotates along a second scanning axis 221 that is perpendicular to the first scanning axis.

In some embodiments, the incoupler 212 has a substantially rectangular profile and is configured to receive the combined light beam 228 and direct the combined light beam 228 into the waveguide 205. The incoupler 212 is defined by a smaller dimension (i.e., width) and a larger orthogonal dimension (i.e., length). In some embodiments, the incoupler 212 has a substantially circular or square shape. In an embodiment, the optical relay 210 is a line-scan optical relay that receives the combined light beam 228 scanned in a first dimension by the first scan mirror (e.g., the first dimension corresponding to the small dimension of the incoupler 212), routes the combined light beam 228 to the second scan mirror 208, and introduces a convergence to the combined light beam 228 in the first dimension to an exit pupil beyond the second scan mirror 208. According to various embodiments, the optical relay 210 includes one or more collimation lenses that shape and focus the combined light beam 228 on the second scan mirror 208 or includes a molded reflective relay that includes two or more spherical, aspheric, parabolic, and/or freeform lenses that shape and direct the combined light beam 228 onto the second scan mirror 208. The second scan mirror 208 receives the combined light beam 228 and scans the combined light beam 228 in a second dimension, the second dimension corresponding to the long dimension of the incoupler 212 of the waveguide 205. In some embodiments, the second scan mirror 208 causes the exit pupil of the combined light beam 228 to be swept along a line along the second dimension. In some embodiments, the incoupler 212 is positioned at or near the swept line downstream from the second scan mirror 208 such that the second scan mirror 208 scans the combined light beam 228 as a line or row over the incoupler 212.

In some embodiments, the optical engine 202 includes edge-emitting laser (EEL) diodes that each emit a light beam 218 having a substantially elliptical, non-circular cross-section, resulting in a combined light beam 228 having an elliptical cross-section. The optical relay 210 magnifies or minimizes the combined light beam 228 along its semi-major or semi-minor axis to circularize the combined light beam 228 prior to convergence of the combined light beam 228 on the second scan mirror 208. In some embodiments, each EEL diode is configured to provide a light beam 218 of a particular wavelength and a collimating lens associated with each EEL diode, such as collimating lens 406 described in greater detail with reference to FIG. 4, collimates the light emitted from the EEL diode to produce a light beam 218 of a specific perimeter. In some embodiments, the perimeter of each light beam 218 is different relative to the light beams 218 emitted by the other EELs in order to reduce bounce separation spacing. That is, each wavelength of light is emitted by an EEL diode and collimated such that its perimeter is different from the perimeter of the other wavelengths of light being emitted by the other EELs in the optical engine 202. As light of shorter wavelengths (e.g., blue light of approximately 450 nm) has a smaller diffraction angle relative to light of longer wavelengths (e.g., red light of approximately 638 nm), an increased beam size for red light will minimize the amount of bounce separation spacing (that is, the distance between a given bounce and the next-closest bounce of light having the same wavelength) in the waveguide 205, thus minimizing degradation of color uniformity in the image represented by the laser light as it traverses the waveguide. In some embodiments, each collimating lens is positioned relative to the corresponding EEL diode to provide a laser light beam of a particular wavelength having a specific perimeter determined by the distance at which the collimating lens is located from the EEL diode. In some such embodiments, a surface of a mirror plate of the scan mirror 206 is elliptical and non-circular (e.g., similar in shape and size to the cross-sectional area of the combined light beam 228). In other such embodiments, the surface of the mirror plate of the scan mirror 206 is circular.

The waveguide 205 of the laser projection system 200 includes the incoupler 212 and the outcoupler 214. The term "waveguide," as used herein, will be understood to mean a combiner using one or more of total internal reflection (TIR), specialized filters, and/or reflective surfaces, to transfer light from an incoupler (such as the incoupler 212) to an outcoupler (such as the outcoupler 214). In some display applications, the light is a collimated image, and the waveguide transfers and replicates the collimated image to the eye. In general, the terms "incoupler" and "outcoupler" will be understood to refer to any type of optical grating structure, including, but not limited to, diffraction gratings, holograms, holographic optical elements (e.g., optical elements using one or more holograms), volume diffraction gratings, volume holograms, surface relief diffraction gratings, and/or surface relief holograms. In some embodiments, a given incoupler or outcoupler is configured as a transmissive grating (e.g., a transmissive diffraction grating or a transmissive holographic grating) that causes the incoupler or outcoupler to transmit light and to apply designed optical function(s) to the light during the transmission. In some embodiments, a given incoupler or outcoupler is a reflective grating (e.g., a reflective diffraction grating or a reflective holographic grating) that causes the incoupler or outcoupler to reflect light and to apply designed optical function(s) to the light during the reflection. In the present example, the light beam 218 received at the incoupler 212 is relayed to the outcoupler 214 via the waveguide 205 using TIR. The light beam 218 is then output to the eye 216 of a user via the outcoupler 214. As described above, in some embodiments the waveguide 205 is implemented as part of an eyeglass lens, such as the lens 108 or lens 110 (FIG. 1) of the display system having an eyeglass form factor and employing the laser projection system 200.

Although not shown in the example of FIG. 2, in some embodiments additional optical components are included in any of the optical paths between the optical engine 202 and the scan mirror 206, between the scan mirror 206 and the optical relay 210, between the optical relay 210 and the scan mirror 208, between the scan mirror 208 and the incoupler 212, between the incoupler 212 and the outcoupler 214, and/or between the outcoupler 214 and the eye 216 (e.g., in order to shape the laser light for viewing by the eye 216 of the user). In some embodiments, a prism is used to steer light from the scan mirror 208 into the incoupler 212 so that light is coupled into incoupler 212 at the appropriate angle to encourage propagation of the light in waveguide 205 by TIR. Also, in some embodiments, an exit pupil expander (e.g., an exit pupil expander 304 of FIG. 3, described below), such as a fold grating, is arranged in an intermediate stage between incoupler 212 and outcoupler 214 to receive light that is coupled into waveguide 205 by the incoupler 212, expand the light, and redirect the light towards the outcoupler 214, where the outcoupler 214 then couples the laser light out of waveguide 205 (e.g., toward the eye 216 of the user).

Figure 3:
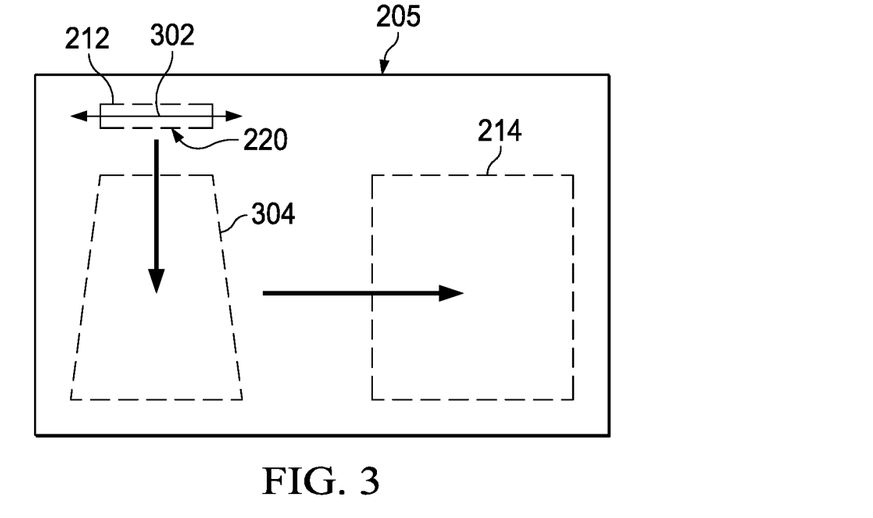
FIG. 3 shows an example of light propagation within the waveguide of the laser projection system of FIG. 2 in accordance with some embodiments.

FIG. 3 shows an example of light propagation within the waveguide 205 of the laser projection system 200 of FIG. 2 in accordance with some embodiments. As shown, light is received via the incoupler 212, having a first edge 220, and scanned along the axis 302 which is parallel to the first edge 220. The light is then directed into an exit pupil expander 304 and is then routed to the outcoupler 214 to be output (e.g., toward the eye of the user). In some embodiments, the exit pupil expander 304 expands one or more dimensions of the eyebox of a WHUD that includes the laser projection system 200 (e.g., with respect to what the dimensions of the eyebox of the WHUD would be without the exit pupil expander 304). In some embodiments, the incoupler 212 and the exit pupil expander 304 each include respective one-dimensional diffraction gratings (i.e., diffraction gratings that extend along one dimension). It should be understood that FIG. 3 shows a substantially ideal case in which the incoupler 212 directs light straight down (with respect to the presently illustrated view) in a first direction that is perpendicular to the scanning axis 302, and the exit pupil expander 304 directs light to the right (with respect to the presently illustrated view) in a second direction that is perpendicular to the first direction. While not shown in the present example, it should be understood that, in some embodiments, the first direction in which the incoupler 212 directs light is slightly or substantially diagonal, rather than exactly perpendicular, with respect to the scanning axis 302.

Figure 4:
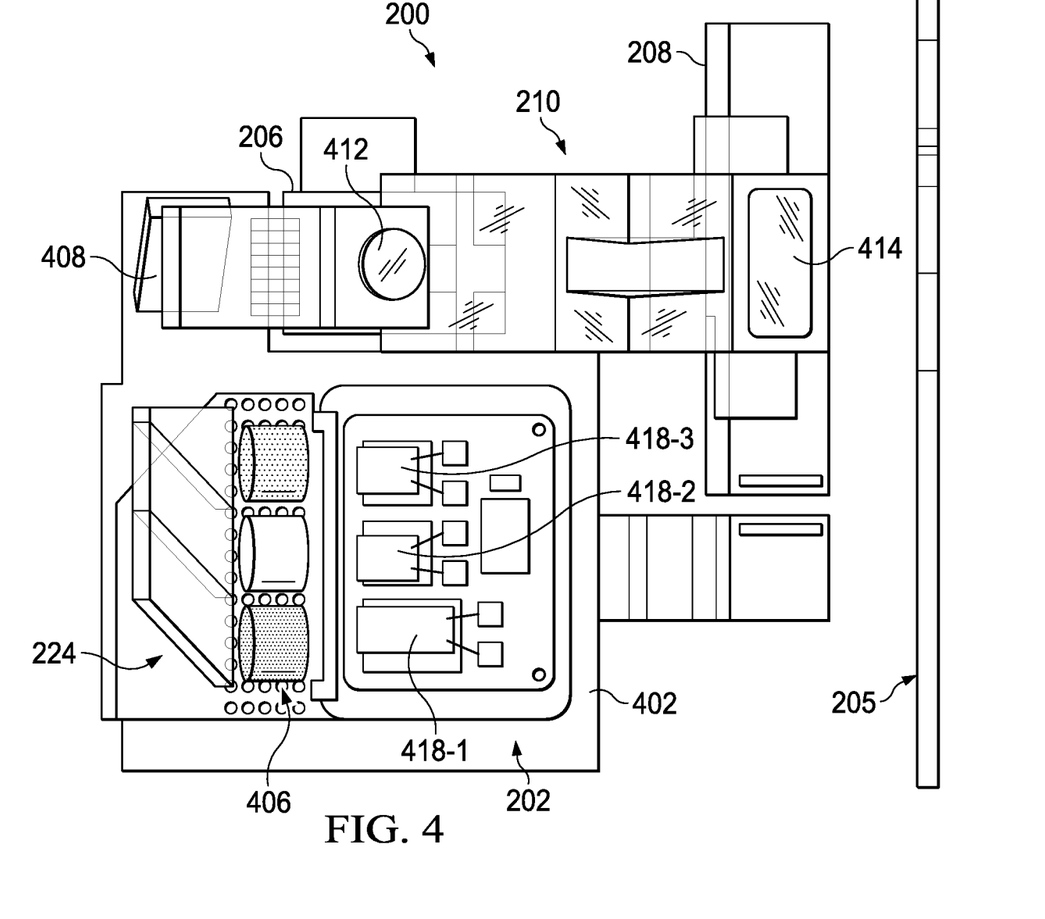
FIG. 4 shows an example embodiment of the laser projection system of FIG. 2 in which the optical relay includes a molded reflective relay in accordance with some embodiments.

FIG. 4 shows an example embodiment of the laser projection system 200 in which the optical relay 210 includes a molded reflective relay. As shown, the laser projection system 200 includes a substrate 402 on which a beam combiner 404, collimating lenses 406, and a mirror 408 are disposed. According to various embodiments, the substrate 402 is a printed circuit board (PCB) or another applicable substrate.

The optical engine 202 is composed of a set of one or more laser light sources 418 (e.g., laser diodes), such as the illustrated red laser light diode 418-1, green laser light diode 418-2, and blue laser light diode 418-3, wherein a processor or other controller operates the optical engine 202 to modulate the respective intensity of each laser diode 418 so as to provide a corresponding red light, green light, and blue light contribution to a corresponding pixel of an image being generated for display to the user. The collimating lenses 406 are each interposed in the light path between a respective laser diode 418 of the optical engine 202 and the beam combiner 404. For example, each laser light source 418 outputs a different wavelength of laser light (e.g., corresponding to respective red, blue, and green wavelengths) through the collimating lenses 406 to be combined at the beam combiner 224 to produce the combined light beam 228 to be projected by the laser projection system 200. The beam combiner 404 receives the individual laser light inputs and outputs a combined laser light beam 228 to the mirror 408, which redirects the combined light beam 228 onto a reflective surface 412 of the scan mirror 206. The scan mirror 206 scans the combined light beam 228 into the optical relay 210 across a first scanning axis. The optical relay 210 is configured to route the combined light beam 228 toward a reflective surface 414 of the scan mirror 208. The scan mirror 208 scans the combined light beam 228 across the incoupler (such as the incoupler 212) of the waveguide 205 along a second scanning axis that is perpendicular to the first scanning axis.

Figure 5:
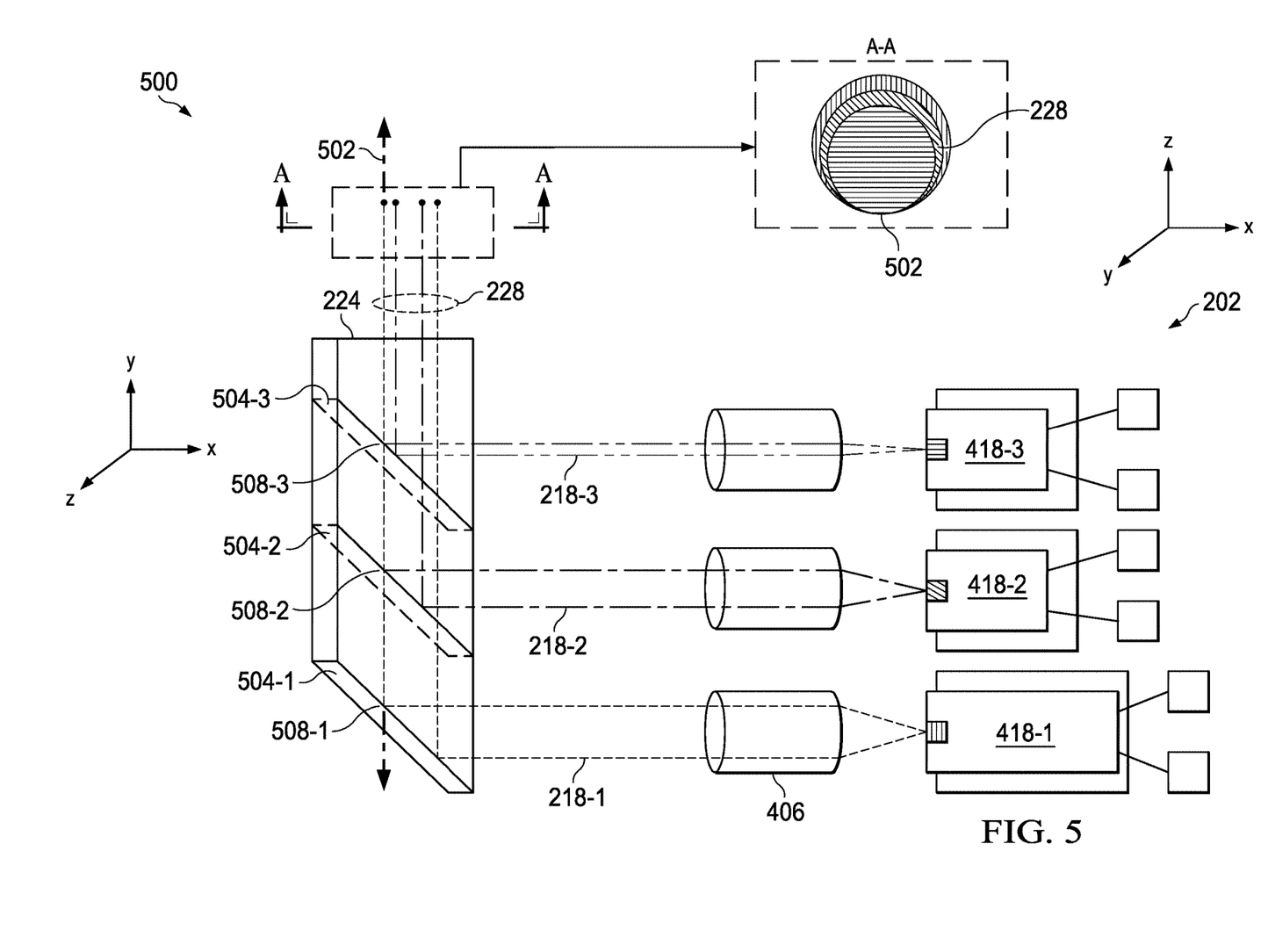
FIG. 5 shows a portion of the laser projection system of FIG. 4, wherein the optical engine and beam combiner are configured to align the beams of laser light on a tangent in accordance with some embodiments.

FIG. 5 shows a portion 500 of the laser projection system 200 of FIG. 4, including the optical engine 202 and an embodiment of beam combiner 224 that is configured to align the beams of light beam 218 on a tangent 502. Each laser diode 418-1, 418-2, 418-3 (collectively and generically 418) projects a beam of laser light composed of a range of wavelengths. For example, laser diode 418-1 projects laser light 218-1, laser diode 418-2 projects laser light 218-2, and laser diode 418-3 projects laser light 218-3. For purposes of illustration, each of light beams 218-1, 218-2, and 218-3 (collectively and generically 218) are represented in FIG. 5 by two lines indicating the edges of the beams of light in a vertical cross-section (i.e., parallel to the propagation direction of the beam of light). The light beam 218 from each of the laser diodes 418 is collimated as it travels through its respective collimating lens 406. The collimating lenses 406 are positioned at a distance from the laser diodes based on the desired perimeter of the collimated light beam 218 that is subsequently transmitted to the beam combiner 224. For example, locating a collimating lens 406 close to its respective laser diode 418 results in a relatively small perimeter light beam 218, whereas locating a collimating lens 406 farther from its respective laser diode 418 results in a larger perimeter light beam 218 because the light beam 218 has experienced greater dispersion (i.e., increased perimeter of the light beam 218) as it travels the longer distance before being intersected by the respective collimating lens 406.

After being collimated at the collimating lenses 406, the light beams 218 are transmitted to the beam combiner 224, which includes at least one reflective surface disposed therein. In some embodiments, the beam combiner 224 includes reflective surfaces 504-1, 504-2, and 504-3 (collectively and generically 504) to receive light beams 218 from each of the respective collimating lenses 406. Thus, in the example shown in FIG. 5, reflective surface 504-1 receives light beam 218-1, reflective surface 504-2 receives light beam 218-2, and reflective surface 504-3 receives light beam 218-3. In some embodiments, the reflective surfaces 504 are disposed at parallel planes within the beam combiner 224 and, thus, the angle at which each of the light beams 218 is reflected from the respective reflective surface 504 is identical or nearly identical. This results in the reflected light beams 218 being directed along the same optical path within the beam combiner 224, and then out of the beam combiner 224 parallel to one another as combined light beam 228.

Spacing between the reflective surfaces 504 within the beam combiner 224 is based on the perimeter and shape of the respective light beam 218 transmitted from the respective collimating lens 406. Spacing between the reflective surfaces 504 is also based on aligning a point of incidence 508-1, 508-2, 508-3 (collectively and generically 508) on each of the reflective surfaces along tangent 502, the point of incidence being a point at which an edge of the respective light beam 218 transmitted from the associated collimating lens 406 is incident on the respective reflective surface 504. For example, the edge of light beam 218-1 is incident on reflective surface 504-1 at point of incidence 508-1, which is aligned with points of incidence 508-2 and 508-3 along tangent 502. Thus, the spacing between reflective surfaces 504 is variable along the z-axis such that an edge of each of the light beams 218-1, 218-2, 218-3 is incident on its respective reflective surface 504 at its respective point of incidence 508 along tangent 502. Consequently, an edge of the resulting combined light beam 228 is also aligned to tangent 502.

As discussed above, it is desirable to bias the position of each of the light beams 218 within the combined light beam 228 away from being concentric such that an edge of each light beam 218 is aligned on a tangent, such as tangent 502. Because this alignment is maintained as the combined light beam 228 is directed through the optical scanner 204, the combined light beam 228 is incident on the incoupler 212 with the edges of the light beams 218 of the combined light beam 228 aligned at an edge of the incoupler 212, such as edge 220 illustrated in FIG. 3, thus reducing instances of double-bounces of the light beams 218 as they are transmitted within the waveguide.

Figure 6:
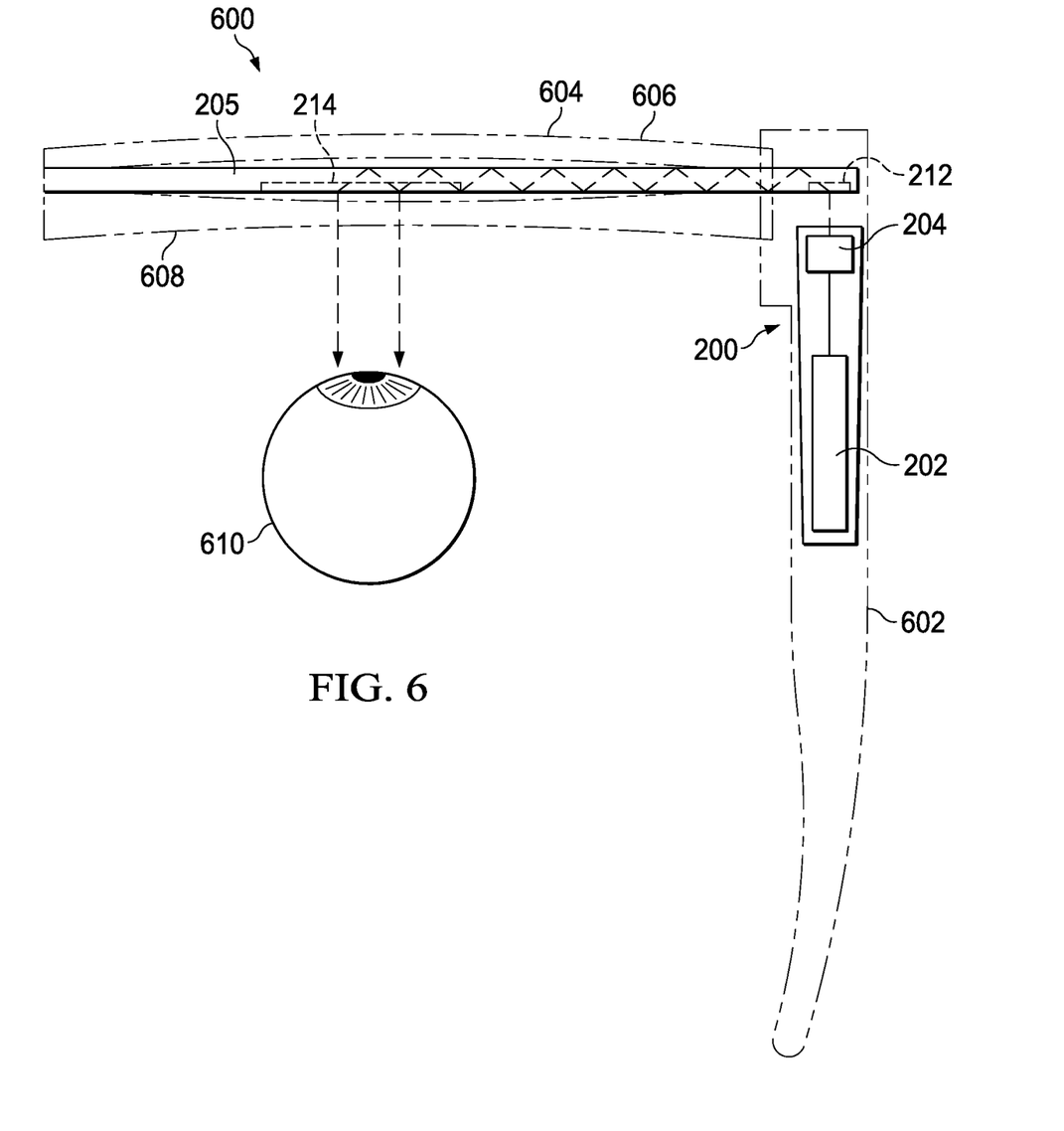
FIG. 6 shows a perspective, partially transparent view of a portion of a WHUD, such as the WHUD of FIG. 6 or the display system of FIG. 1 in accordance with some embodiments.

FIG. 6 illustrates a portion of a WHUD 600 that includes the laser projection system 200 of FIG. 2. In some embodiments, the WHUD 600 represents the display system 100 of FIG. 1. The optical engine 202, beam combiner 224, optical scanner 204, incoupler 212, and a portion of the waveguide 205 are included in an arm 602 of the WHUD 600, in the present example.

The WHUD 600 includes an optical combiner lens 604, which includes a first lens 606, a second lens 608, and the waveguide 205, with the waveguide 205 disposed between the first lens 606 and the second lens 608. Light exiting through the outcoupler 214 travels through the second lens 608 (which corresponds to, for example, the lens element 110 of the display system 100). In use, the light exiting second lens 608 enters the pupil of an eye 610 of a user wearing the WHUD 600, causing the user to perceive a displayed image carried by the laser light output by the optical engine 202. The optical combiner lens 604 is substantially transparent, such that light from real-world scenes corresponding to the environment around the WHUD 600 passes through the first lens 606, the second lens 608, and the waveguide 205 to the eye 610 of the user. In this way, images or other graphical content output by the laser projection system 200 are combined (e.g., overlayed) with a real-world view of the user's environment to provide an AR experience to the user.

Although not shown in the depicted example, in some embodiments additional optical elements are included in any of the optical paths between the optical engine 202 and the incoupler 212, in between the incoupler 212 and the outcoupler 214, and/or in between the outcoupler 214 and the eye 610 of the user (e.g., in order to shape the laser light for viewing by the eye 610 of the user). As an example, a prism is used to steer light from the optical scanner 204 into the incoupler 212 so that light is coupled into incoupler 212 at the appropriate angle to encourage propagation of the light in waveguide 205 by TIR. Also, in some embodiments, an exit pupil expander (e.g., the exit pupil expander 304), such as a fold grating, is arranged in an intermediate stage between incoupler 212 and outcoupler 214 to receive light that is coupled into waveguide 205 by the incoupler 212, expand the light, and redirect the light towards the outcoupler 214, where the outcoupler 214 then couples the laser light out of waveguide 205 (e.g., toward the eye 610 of the user).

Figure 7:
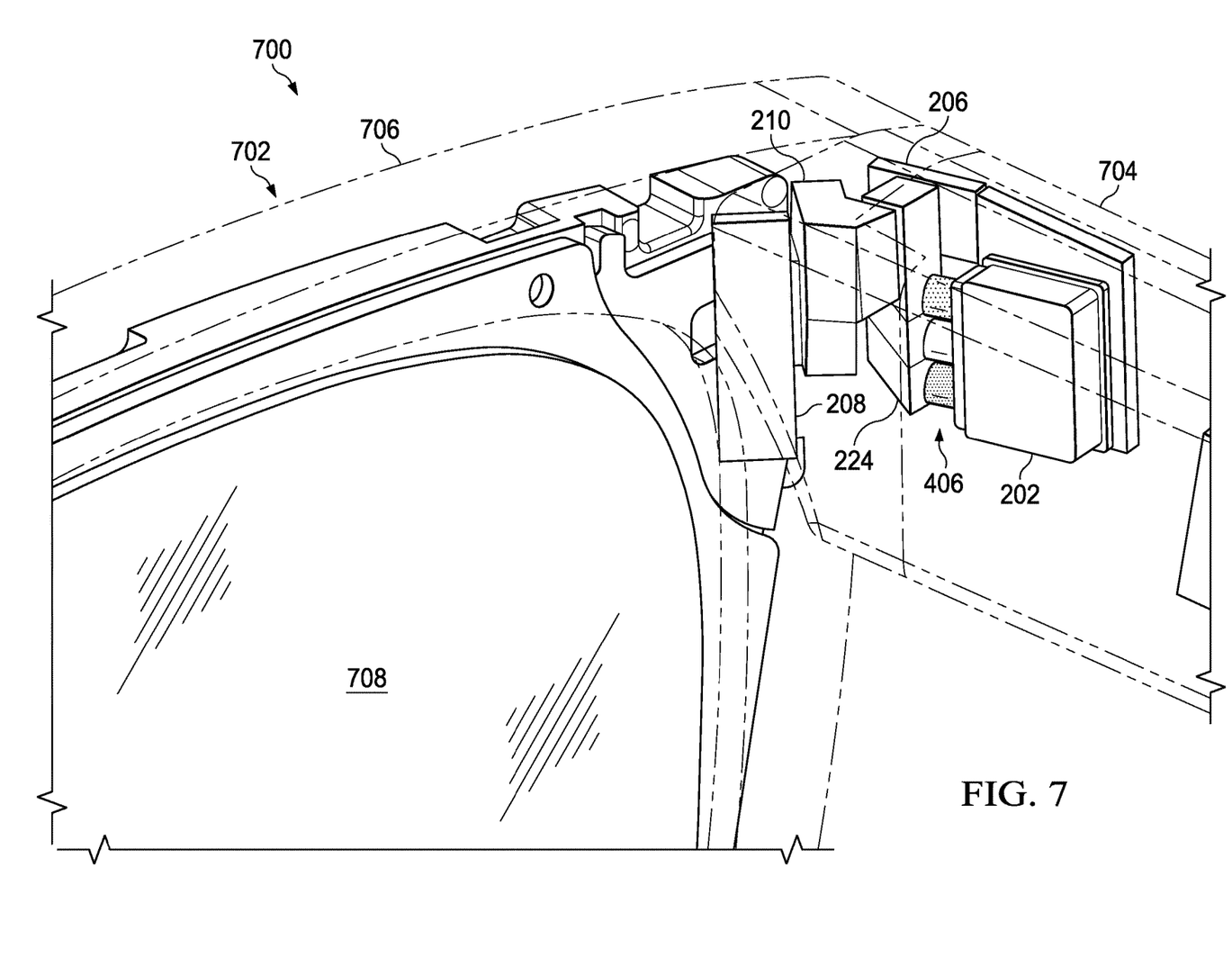
FIG. 7 shows a perspective, partially transparent view of a portion of a WHUD, including an example arrangement of the laser projection system of FIG. 4 in accordance with some embodiments.

FIG. 7 shows a perspective, partially transparent view of a portion of a WHUD 700, which represents the WHUD 600 of FIG. 6 or the display system 100 of FIG. 1. The WHUD 700 includes an example arrangement of the laser projection system 200 of FIGS. 2 and 4 an embodiment in which the optical relay 210 is a molded reflective relay. In some embodiments, the WHUD 700 corresponds to the display system 100 of FIG. 1, and the illustrated portion of the WHUD 700 corresponds to region 112 of the display system 100.

The arm 704 of the WHUD 700 houses the optical engine 202, the beam combiner 224, the collimating lenses 406, and at least a portion of the first scan mirror 206. A frame section 706 of the WHUD 700 houses the second scan mirror 208, portions of the first scan mirror 206, and the optical relay 210. The incoupler 212 and the outcoupler 214 of the waveguide 205, are each embedded in or otherwise disposed on the lens 708 (one embodiment of, for example, lens 110 of FIG. 1). As described previously, combined light beam 228 output by the optical engine 202 is routed to the incoupler 212 via at least the first scan mirror 206, the optical relay 210, and the second scan mirror 208. The first scan mirror 206 oscillates or otherwise rotates to scan the combined light beam 228 along a first scanning axis, and the second scan mirror 208 oscillates or otherwise rotates to scan the combined light beam 228 along a second scanning axis that is perpendicular to the first scanning axis. Combined laser light 228 reflected by the second scan mirror 208 converges to a line at the incoupler 212. Combined light beam 228 received at the incoupler 212 is routed to the outcoupler 214 via the waveguide 205. The light received at the outcoupler 214 is then directed out of the waveguide 205 (e.g., toward the eye of a user of the WHUD 700).

To reduce degradation of color uniformity of the light directed out of the waveguide, it is desirable to minimize instances of double-bounces and reduce bounce separation spacing. Accordingly, a system, such as the WHUD of FIG. 6 or FIG. 7, includes beam combiner 224 to reduce the possibility that light will encounter the incoupler more than once by aligning each beam of light at an edge of the incoupler, for example, the first or second edge 220, 222 shown in FIG. 2, that lies in the direction of light propagation within the waveguide. By aligning the light beams with the edge of the incoupler, the light beams are directed into the waveguide by the incoupler and then along a path directed away from the incoupler in order to reduce the possibility that the light beams will encounter the incoupler more than once. In some embodiments, the beam combiner 224 includes reflective surfaces configured to align each laser light beam emitted by the laser light projector such that the beams are tangent with an edge of the incoupler in order to minimize double-bounces by laser light beams entering the waveguide via an incoupler.

Figure 8:
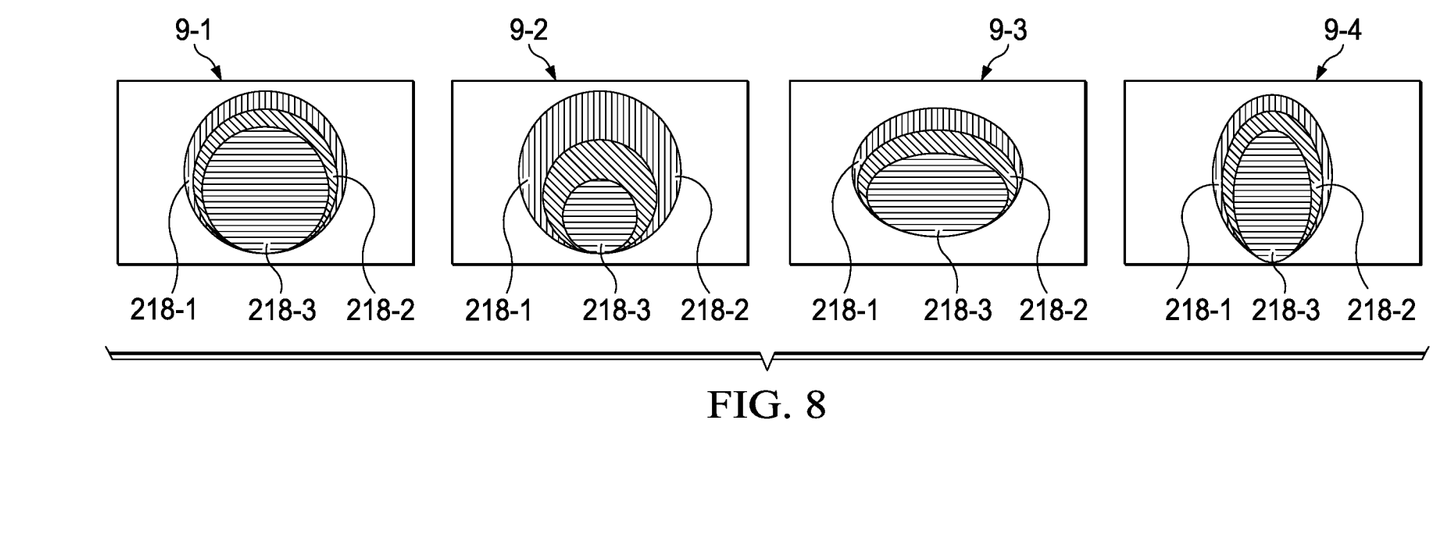
FIG. 8 shows example cross-sections of non-concentric combined light beams to be provided from an optical engine to a waveguide, such as the optical engine and waveguide of FIG. 2, in accordance with some embodiments.

FIG. 8 illustrates example cross-sections of combined light beams 228 to be provided from an optical engine to a waveguide, such as the optical engine 202 and waveguide 205 of FIG. 2. In some embodiments, the light beams 218 within the combined light beam 228 are non-concentric and biased to be aligned on a tangent, such as tangent 502 of FIG. 5. Aligning the beams along a tangent reduces the possibility of the light beams encountering the incoupler of the waveguide a second time after being directed into the waveguide. Cross-sections 9-1 and 9-2 illustrate circular, non-concentric combined light beams 228 composed of red laser light 218-1, green laser light 218-2, and blue laser light 218-3 beams having different perimeters. Cross-sections 9-3 and 9-4 illustrate non-concentric combined light beams 228 composed of red laser light 218-1, green laser light 218-2, and blue laser light 218-3 beams having differing major and minor axes lengths. In some embodiments, biasing each of the light beams 218 to be tangent to an edge of the incoupler 212 is achieved by employing at least one alignment component configured to adjust the positioning of the laser light beams such that an edge of each of the light beams 218 lies on a common tangent.

Note that not all of the activities or elements described above in the general description are required, that a portion of a specific activity or device may not be required, and that one or more further activities may be performed, or elements included, in addition to those described. Still further, the order in which activities are listed is not necessarily the order in which they are performed. Also, the concepts have been described with reference to specific embodiments. However, one of ordinary skill in the art appreciates that various modifications and changes can be made without departing from the scope of the present disclosure as set forth in the claims below. Accordingly, the specification and figures are to be regarded in an illustrative rather than a restrictive sense, and all such modifications are intended to be included within the scope of the present disclosure.

Benefits, other advantages, and solutions to problems have been described above with regard to specific embodiments. However, the benefits, advantages, solutions to problems, and any feature(s) that may cause any benefit, advantage, or solution to occur or become more pronounced are not to be construed as a critical, required, or essential feature of any or all the claims. Moreover, the particular embodiments disclosed above are illustrative only, as the disclosed subject matter may be modified and practiced in different but equivalent manners apparent to those skilled in the art having the benefit of the teachings herein. No limitations are intended to the details of construction or design herein shown, other than as described in the claims below. It is therefore evident that the particular embodiments disclosed above may be altered or modified and all such variations are considered within the scope of the disclosed subject matter. Accordingly, the protection sought herein is as set forth in the claims below.

What is claimed is:

1. A laser projection system comprising:
an optical engine comprising a plurality of laser diodes configured to emit a plurality of light beams; and
a beam combiner having a plurality of reflective surfaces each configured to receive a light beam of the plurality of light beams from one of the plurality of laser diodes and to reflect the received light beam such that an edge of the reflected light beam lies on a tangent common to the plurality of light beams reflected from other of the plurality of reflective surfaces, wherein at least one light beam of the plurality of light beams has a different perimeter relative to at least one other light beam of the plurality of light beams upon exiting the beam combiner.

2. The laser projection system of claim 1, wherein each of the plurality of laser diodes emits light over a unique range of wavelengths relative to the other plurality of laser diodes.

3. The laser projection system of claim 1, wherein the plurality of reflective surfaces are disposed at parallel planes intersecting an optical path within the beam combiner.

4. The laser projection system of claim 3, wherein a position of each of the plurality of reflective surfaces within the beam combiner is based on aligning an edge of each the plurality of light beams on a tangent.

5. The laser projection system of claim 3, wherein spacing between each of the plurality of reflective surfaces within the beam combiner is based on aligning an edge of each the plurality of light beams on a tangent.

6. The laser projection system claim 3, wherein the tangent corresponds to an edge of an incoupler of a waveguide associated with the laser projection system, wherein each light beam of the plurality of light beams has a perimeter that is proportional to a diffraction angle to be imparted on the respective light beam when incident on the incoupler.

7. A method comprising:
at a laser projection system comprising a plurality of laser diodes and a beam combiner having a plurality of reflective surfaces disposed therein, wherein each of the plurality of reflective surfaces is positioned to receive a light beam projected from one of the plurality of laser diodes:
projecting a plurality of light beams from the plurality of laser diodes; and
generating a combined light beam by reflecting the plurality of light beams from the plurality of reflective surfaces such that an edge of each of the plurality of light beams is aligned on a tangent, wherein at least one light beam of the plurality of light beams has a different perimeter relative to at least one other light beam of the plurality of light beams within the combined light beam.

8. The method of claim 7, wherein each of the plurality of laser diodes emits light over a unique range of wavelengths relative to the other plurality of laser diodes.

9. The method of claim 8, wherein each of the plurality of laser diodes emits light over a unique range of wavelengths relative to the other plurality of laser diodes.

10. The method of claim 7, wherein the plurality of reflective surfaces are disposed at parallel planes intersecting an optical path within the beam combiner.

11. The method of claim 10, wherein:
each of the plurality of reflective surfaces within the beam combiner is positioned such that an edge of each of the light beams reflected by each of the plurality of reflective surfaces is aligned on a tangent common to an edge of one of the other plurality of light beams reflected from a different one of the plurality of reflective surfaces.

12. The method of claim 10, further comprising:
spacing each of the plurality of reflective surfaces within the beam combiner such that an edge of each of the light beams reflected by each of the plurality of reflective surfaces is aligned on a tangent common to an edge of one of the other plurality of light beams reflected from a different one of the plurality of reflective surfaces.

13. The method of claim 7, wherein the tangent corresponds to an edge of an incoupler of a waveguide associated with the laser projection system.

14. A head-mounted display (HMD) comprising:
   a laser projection system comprising:
      an optical engine comprising a plurality of laser diodes configured to emit a plurality of light beams; and
      a beam combiner having a plurality of reflective surfaces configured to generate a combined light beam by reflecting the plurality of light beams from the plurality of reflective surfaces such that an edge of each of the plurality of light beams is aligned on a tangent, wherein at least one light beam of the plurality of light beams has a different perimeter relative to at least one other light beam of the plurality of light beams within the combined light beam; and
   a waveguide having an incoupler to receive the combined light beam, wherein an edge of the incoupler corresponds to the tangent on which the edges of the plurality of light beams are aligned.

15. The HMD of claim 14, wherein each of the plurality of laser diodes emits light over a unique range of wavelengths relative to the other plurality of laser diodes.

16. The HMD of claim 14, wherein the plurality of reflective surfaces are disposed at parallel planes intersecting an optical path within the beam combiner.

17. The HMD of claim 14, wherein a position of each of the plurality of reflective surfaces and a spacing between each of the plurality of reflective surfaces within the beam combiner is based on aligning an edge of each the plurality of light beams on a tangent.

* * * * *